(12) United States Patent
Andress et al.

(10) Patent No.: US 7,031,100 B2
(45) Date of Patent: Apr. 18, 2006

(54) MOTOR TORQUE CONSTANT VARIATION COMPENSATION

(75) Inventors: Jeffrey D. Andress, Edmond, OK (US); Philip R. Woods, Oklahoma City, OK (US); Ryan Todd Lyle, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 302 days.

(21) Appl. No.: 10/323,130

(22) Filed: Dec. 18, 2002

(65) Prior Publication Data

US 2004/0001278 A1    Jan. 1, 2004

Related U.S. Application Data

(60) Provisional application No. 60/392,182, filed on Jun. 28, 2002.

(51) Int. Cl.
*G11B 5/596* (2006.01)

(52) U.S. Cl. ................................... 360/78.06

(58) Field of Classification Search ............ 360/28.06, 360/78.07, 78.09, 78.069; 318/561, 568.2; 369/44.27, 44.28
See application file for complete search history.

(56) References Cited

U.S. PATENT DOCUMENTS

| | | | |
|---|---|---|---|
| 5,132,855 A * | 7/1992 | Waugh et al. ........... | 360/78.07 |
| 5,305,160 A | 4/1994 | Funches et al. | |
| 5,475,545 A | 12/1995 | Hampshire et al. | |
| 5,793,558 A * | 8/1998 | Codilian et al. ......... | 360/78.06 |
| 5,828,515 A * | 10/1998 | Kim ....................... | 360/78.06 |
| 5,898,286 A * | 4/1999 | Clare et al. ................ | 318/569 |
| 5,956,201 A * | 9/1999 | Pham et al. ............. | 360/78.09 |
| 6,009,052 A | 12/1999 | Hashimoto | |
| 6,031,684 A | 2/2000 | Gregg | |
| 6,046,878 A | 4/2000 | Liu et al. | |
| 6,055,121 A | 4/2000 | Du et al. | |
| 6,088,185 A | 7/2000 | Ratliff et al. | |
| 6,169,382 B1 * | 1/2001 | McKenzie et al. .......... | 318/561 |
| 6,445,531 B1 | 9/2002 | Gaertner et al. | |
| 6,570,733 B1 * | 5/2003 | Waugh et al. ........... | 360/78.06 |
| 6,590,735 B1 * | 7/2003 | Brittner et al. .......... | 360/78.07 |

* cited by examiner

*Primary Examiner*—K. Wong
(74) *Attorney, Agent, or Firm*—Fellers, Snider, et al.

(57) ABSTRACT

Method and apparatus for compensating for a decrease in the torque constant of an actuator motor in a data storage device. An actuator supports the head adjacent a data recording surface on which a plurality of tracks are defined. A servo circuit outputs current to the actuator motor to carry out a seek to move the head from an initial track to a destination track in accordance with a velocity profile having a nominal deceleration trajectory along which the head is decelerated to reach the destination track. The servo circuit operates to adjust an initial value of gain to a second value in response to a selected parameter, and scales the nominal deceleration trajectory to a derated deceleration trajectory in relation to the second value of the gain. The derated deceleration trajectory is preferably selected in relation to the difference between the second value of gain and a predetermined threshold.

5 Claims, 5 Drawing Sheets

MOTOR TORQUE CONSTANT VARIATION COMPENSATION

RELATED APPLICATIONS

This application claims domestic priority under 35 U.S.C. §119(e) to U.S. Provisional Application No. 60/392,182 filed Jun. 28, 2002 and entitled "Robust Seek Scaling Algorithm for Low Torque."

FIELD OF THE INVENTION

This invention relates generally to the field of digital data storage devices and more particularly, but not by way of limitation, to a system and method for performing robust seek scaling to compensate for lower than expected motor torque in a disc drive servo system.

BACKGROUND

Disc drives are data storage devices used to store and retrieve digital user data in a fast and efficient manner. A typical disc drive stores such data on a number of magnetic recording discs which are rotated at a constant high speed. An actuator controllably moves a corresponding number of data transducing heads to access data stored in tracks defined on the disc surfaces.

Servo data are written to the discs during disc drive manufacturing to define the tracks and to provide head positional information to a closed loop servo control circuit. The servo circuit applies current to an actuator motor to move the heads across the disc surfaces. In an embedded servo scheme, the servo data are arranged in servo sector patterns. The servo sectors are angularly spaced apart and interspersed with user data sectors to which user data are stored.

A continuing trend in the disc drive industry is to provide disc drives with ever increasing data storage and transfer rate capacities. As track densities continue to increase, it becomes increasingly important to provide servo circuits that are capable of accurately positioning the heads during seeks and track following modes of operation. Various gains of the servo circuit are typically selected to achieve a certain control response for the servo circuit; however, changes in environmental conditions and other factors tend to affect the characteristics of the actuator motor and servo circuit during operation.

Accordingly, there is a continuing need for improvements in the art whereby the robustness of disc drive servo systems can be enhanced over a broader range of environmental conditions.

SUMMARY OF THE INVENTION

Preferred embodiments of the present invention are generally directed to a method and apparatus for compensating for variation in the torque constant of a motor, such as an actuator motor used by a servo control circuit to position a data transducing head in a data storage device, such as a disc drive.

In accordance with preferred embodiments, the disc drive includes an actuator which supports the head adjacent a data recording surface on which a plurality of tracks are defined. The actuator motor is coupled to the actuator and configured to move the head across the data recording surface.

A servo circuit outputs current to the actuator motor to carry out a seek to move the head from an initial track to a destination track in accordance with a velocity profile having a nominal deceleration trajectory along which the head is decelerated to reach the destination track.

The servo circuit operates to adjust an initial value of gain to a second value in response to a selected parameter, and scales the nominal deceleration trajectory to a derated deceleration trajectory in relation to the second value of the gain.

Preferably, the servo circuit operates to accumulate velocity error during the seek and adjusts the initial value of the gain to the second value in relation to the accumulated velocity error. The servo circuit further preferably compares the second value of the gain to a predetermined threshold and selects the derated deceleration trajectory in relation to a difference between the second value of the gain and the predetermined threshold.

These and various other features and advantages which characterize the claimed invention will be apparent from a reading of the following detailed description and a review of the associated drawings.

DETAILED DESCRIPTION

Figure 1:
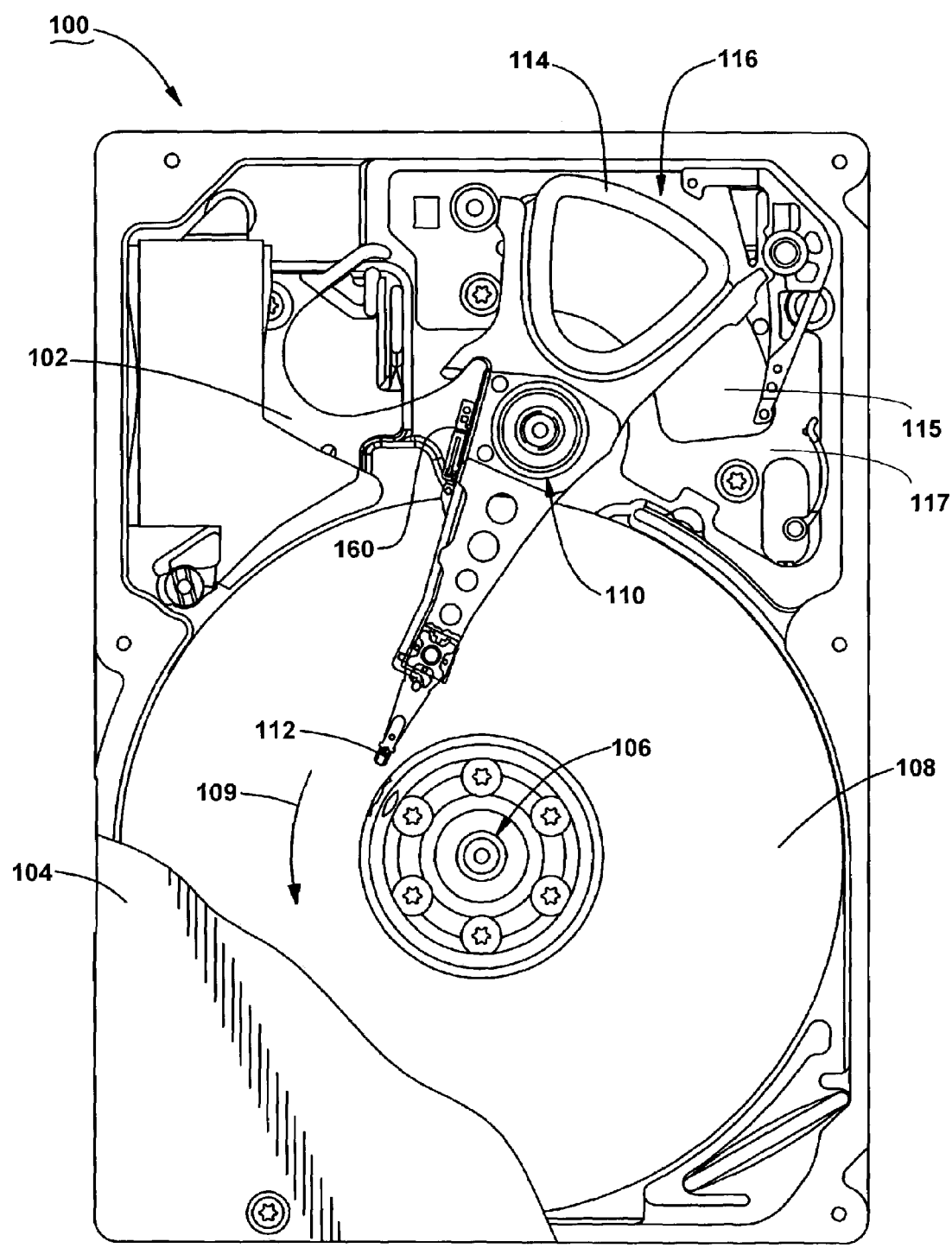
FIG. 1 is a top plan view of a disc drive data storage device constructed and operated in accordance with preferred embodiments of the present invention.

FIG. 1 shows a disc drive data storage device 100 of the type used to store and retrieve digital data. A base deck 102 cooperates with a top cover 104 (shown in partial cutaway) to form an environmentally controlled housing for the drive 100.

A spindle motor 106 supported within the housing rotates a number of rigid magnetic recording discs 108 in a rotational direction 109. An actuator 110 is provided adjacent the discs 108 and moves a corresponding number of heads 112 across the disc recording surfaces through application of current to an actuator coil 114 of a voice coil motor (VCM) 116. The VCM 116 employs one or more permanent magnets 115 and magnetically permeable pole pieces 117 to form a magnetic circuit in which the coil 114 is immersed.

Figure 2:
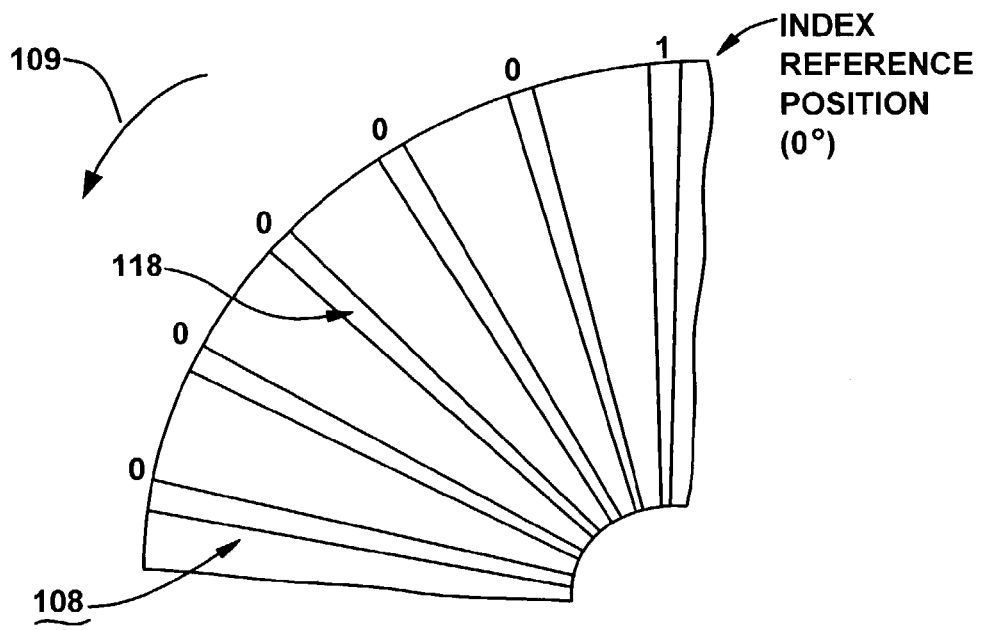
FIG. 2 depicts the surface a data storage disc of the disc drive of FIG. 1

FIG. 2 shows a portion of one of the discs 108. Servo wedges 118 radially extend from the innermost to the outermost radii of the disc recording surfaces. The servo wedges 118 are written during disc drive manufacturing to define a number of concentric tracks 120 as shown in FIG.

3. Each servo wedge 118 comprises a plurality of radially aligned servo sectors (S) 122.

User data sectors 124 are defined in the areas along the tracks between adjacent servo sectors 122 during a disc drive formatting operation. The sectors 124 store fixed-size blocks (such as 512 bytes) of user data from a host device. While the number of servo wedges 118 per disc will depend upon the configuration of a particular drive, it will be contemplated for purposes of the present discussion that each disc surface in the disc drive 100 has a total of 192 such wedges 118. Thus, each selected head 112 will encounter a total of 192 servo sectors 122 over each full revolution of the associated disc 108.

Figure 3:
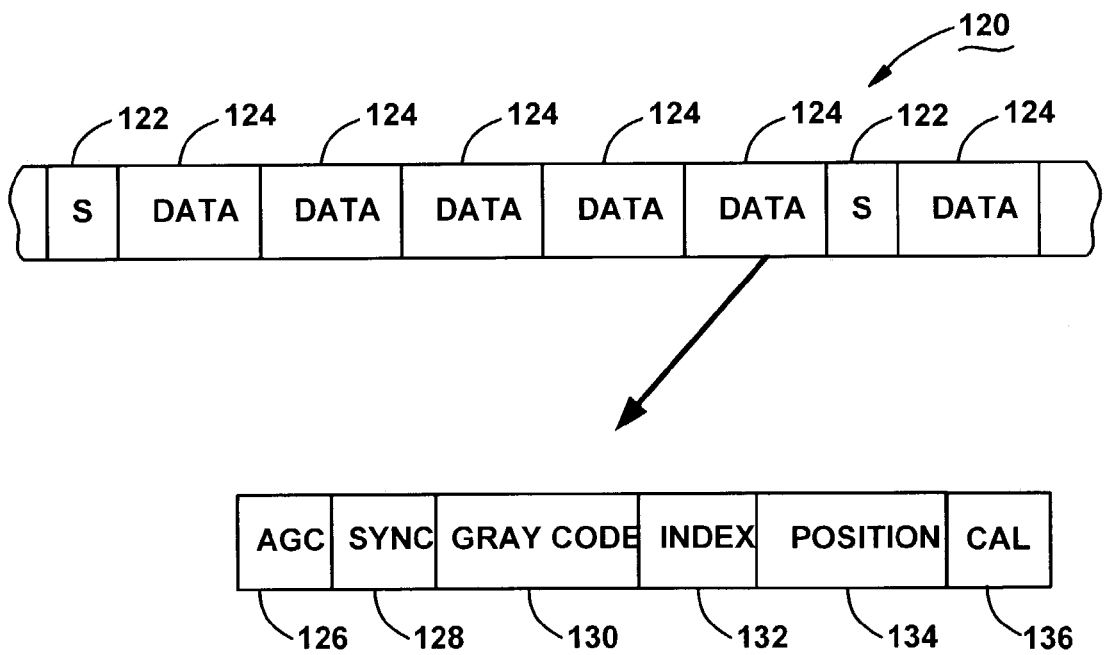
FIG. 3 illustrates the manner in which a track of information is stored on the data storage disc of FIG. 2.

As exemplified by FIG. 3, each servo sector includes an automatic gain control (AGC) field 126, a synchronization (sync) field 128, a Gray code (GC) field 130, an index field 132, a position field 134 and a calibration (CAL) field 136. The AGC field 126 provides an oscillating (2T) pattern that allows the proper gain characteristics to be set in preparation for receipt of the remaining servo data. The sync field 128 provides a particular bit sequence for timing detection. The GC field 130 provides a unique track address to indicate the radial position of the head 112.

The index field 132 indicates the angular position of the head 112 and identifies a once-around "index reference position" (i.e., zero degrees) reference point. The position field 134 provides intra-track positioning data, and the calibration field 136 stores a calibration term that reduces repeated run out (RRO) in the track. Other configurations for the servo sectors 122 can readily be used as desired.

Figure 4:
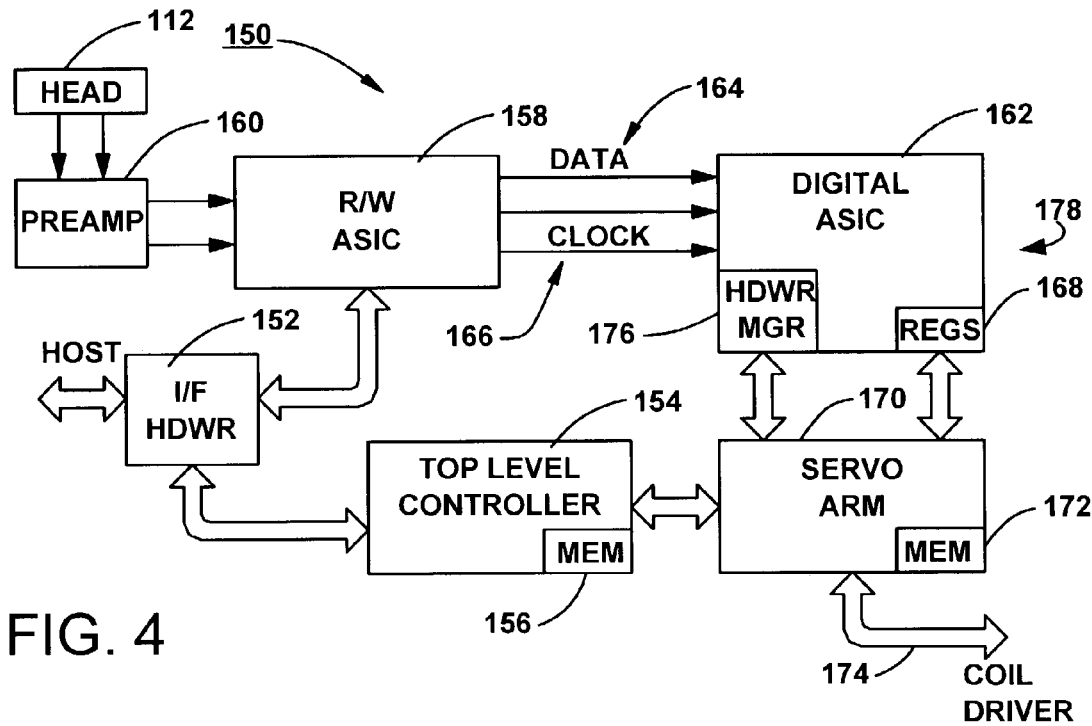
FIG. 4 is a functional block diagram of communication and control electronics of the disc drive of FIG. 1.

FIG. 4 provides a functional block diagram of communication and control electronics 150 of the disc drive 100 of FIG. 1. Interface (I/F) hardware 152 provides communication ports with the host device and includes a data buffer, error correction code (ECC) circuitry, and a sequencer (disc manager). Overall disc drive control is provided by a top level controller 154 with associated memory 156. The controller 154 and interface hardware 152 operate in accordance with a selected industry standard host communications protocol, such as Fibre Channel.

A read/write application specific integrated circuit (R/W ASIC) 158 includes read and write channel circuitry to provide the requisite encoding for data to be written to the discs 108, and the requisite signal processing to decode transduced readback signals from the selected head 112. Such readback signals first undergo preamplification by a preamplifier/driver circuit (preamp) 160 mounted to the side of the actuator 110 (FIG. 1). Preferably, the R/W ASIC is a purchased component commercially available from a number of sources such as Marvel Technology, Inc.

The R/W ASIC 158 includes servo demodulation capabilities that enable the device to detect and output the servo data from the servo fields 122 to a digital ASIC 162. The servo data are provided along serial data lines 164 and a clock signal is provided via clock line 166. The digital ASIC 162 conditions the servo data by detecting the various different types of servo data (Gray code, position field data, etc.) and arranging the data into multi-bit form (e.g., 16-bits).

The conditioned servo data are loaded into registers 168 for retrieval by a servo ARM (advanced RISC (reduced instruction set computer) machine) device 170. The ARM device 170 is a servo processor which operates in accordance with programming in ARM memory 172 and instructions from the controller 154. The ARM device 170 outputs coil current commands via path 174 to a coil driver (not shown) which in turn applies the appropriate current to the actuator coil 114 (FIG. 1) to position the selected head as desired across the surface of the associated disc 108.

The digital ASIC 162 includes a hardware manager 176. The hardware manager 176 provides various timing control functions including counting the number of servo sectors 122 that have passed the head 112 since the most recent index reference position. The hardware manager 176 thus provides a continual indication of the angular position of the heads 112 to the ARM device 170. For reference, the demodulation portions of the R/W ASIC 158, the digital ASIC 162, the ARM device 170 and the coil driver collectively form a servo control circuit (generally denoted at 178).

Figure 5:
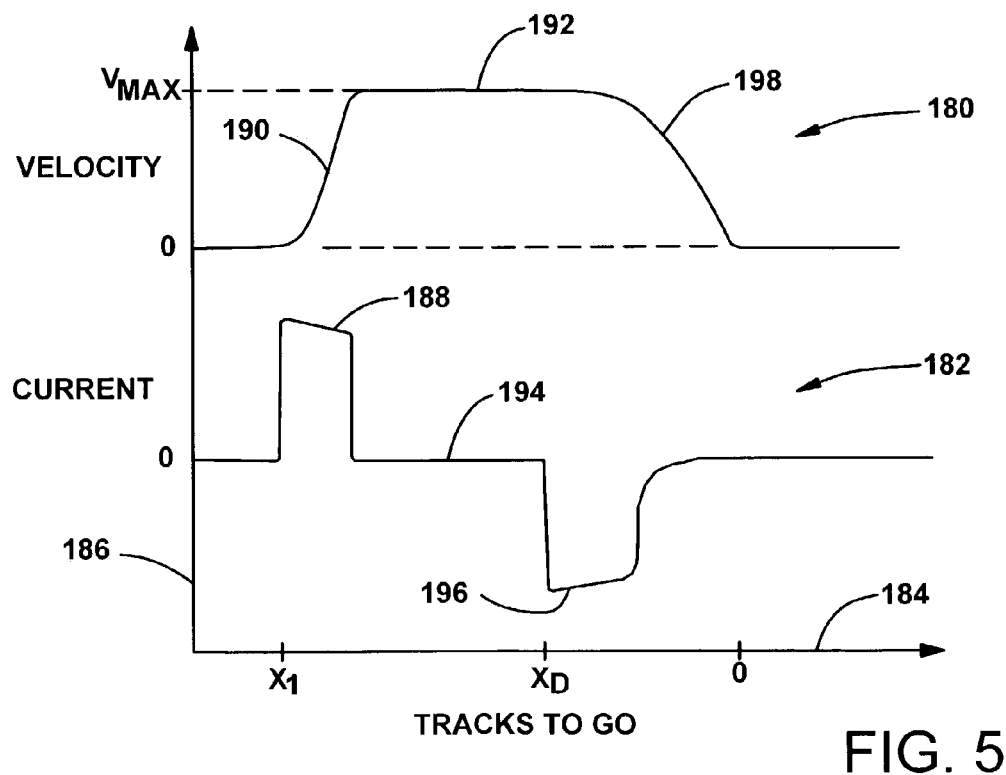
FIG. 5 illustrates a velocity trajectory and a current profile during a seek operation carried out by the servo control circuit of FIG. 4.

The servo data from the servo sectors 122 are transduced and used by the servo control circuit 178 both during track following in which a selected head is maintained over a selected track, as well as during seek operations in which a selected head is moved from an initial track to a destination track. FIG. 5 generally illustrates the operation of the servo circuit 178 during a velocity controlled seek operation in which a selected head 112 is moved from an initial track to a destination track on an associated disc surface.

FIG. 5 provides a velocity profile (trajectory) curve 180 and an actuator coil current curve 182, plotted against a position x-axis 184 indicative of the number of tracks to go during the seek and a common amplitude y-axis 186. In the exemplary seek of FIG. 5, it will be understood that the seek is carried out to move the selected head 112 from an initial track X1 to a destination track 0.

During the seek, a relatively large amount of current is applied to the coil 114 (as shown at 188) to cause a rapid acceleration of the head 112 (portion 190) away from the initial track (position X1). The acceleration continues until the head 112 reaches a maximum velocity, VMAX (portion 192). Once the maximum velocity is attained, the current drops to substantially zero amps (portion 194) and the head 112 "coasts" at this velocity.

Once a deceleration point XD is reached, a relatively large amount of braking current (portion 196) is applied having a direction opposite that of the initial acceleration current 188. The braking current 196 nominally causes the velocity of the head to follow a selected deceleration profile (portion 198). The deceleration profile 198, also referred to as the deceleration trajectory, is selected to nominally cause the head 112 to reach and settle onto the destination track in a minimal amount of time.

The foregoing seek operation is carried out by determining the radial velocity of the head 112 and continually adjusting the amount of applied current to cause the velocity to follow the desired trajectory. This velocity is preferably determined through the detection and decoding of the servo data on the intermediary tracks between the initial track and the destination track.

Figure 6:
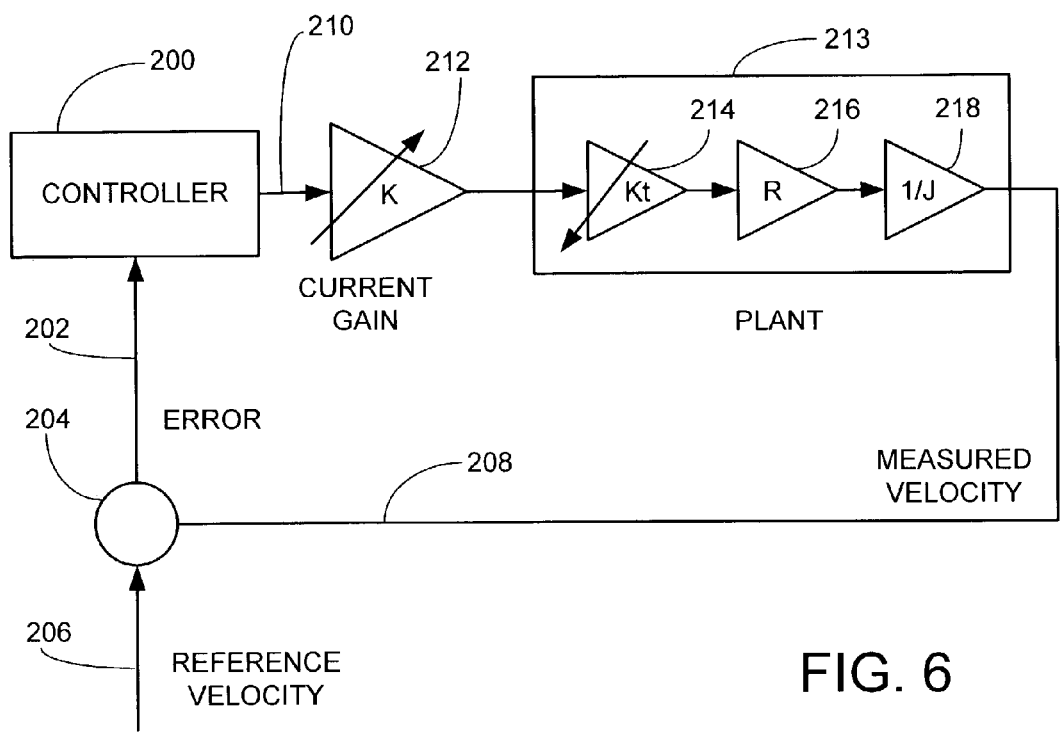
FIG. 6 shows a functional block diagram representative of the operation of the servo control circuit in accordance with preferred embodiments of the present invention.

FIG. 6 provides a functional block diagram of relevant portions of the servo circuit 178 during the seek of FIG. 5. A controller block 200 receives an error signal on path 202 from summing junction 204 as the difference between a reference velocity (path 206) and a measured velocity (path 208). The reference velocity corresponds to the velocity profile 180 of FIG. 5. The controller 200 outputs a current command value on path 210 which is multiplied by an adjustable current gain K by gain block 212 to provide a current command to a plant block 213 (generally corresponding to the coil driver, actuator 110 and VCM 116).

The gain block 212 provides primary control of the overall servo loop gain and is adaptively adjusted during operation to maintain the response of the loop within desired parameters in the face of changed environmental conditions (temperature, different operational zones across the discs, etc.). One exemplary manner in which the current gain K can be adjusted is by integrating velocity error at concluding portions of a velocity controlled seek such as shown in FIG. 5, and adjusting the gain in relation to the integrated velocity error value. Other methods for adjusting the current gain K are readily contemplated, however, such as adjusting the gain in relation to position error, changes in temperature, etc.

The plant block 213 is represented by three successive gain blocks: a VCM torque constant (Kt) block 214 representative of VCM torque, an actuator radius (R) block 216 representative of the radial location of the actuator 110, and an inertia (I/J) block 218 indicative of the inertia (J) of the actuator 110. Changes in VCM torque constant occur due to a number of factors such as increase in operational temperature, and such changes can be observed but not controlled.

As will be apparent from FIGS. 5 and 6, changes in the torque constant Kt can be compensated by making a corresponding inverse change to the current gain K to maintain a substantially constant overall servo loop gain. Thus, seek operations will continue to follow the profile of FIG. 5 despite changes in the torque constant, at least to the point where an increase in current gain results in saturation of the magnetic components of the VCM. Once saturation begins to occur, further increases in current gain will not produce the desired increase in overall loop gain and seeks will conclude with excessive velocity error (and take longer to complete due to excessive settling correction).

To avoid saturation, a predetermined threshold T for the gain K is selected below which saturation will not generally occur. This threshold is preferably empirically derived. Once this threshold T is reached, the servo circuit 178 operates to scale the deceleration trajectory (198, FIG. 5) to compensate for the lower torque constant. Preferably, the deceleration trajectory is adaptively scaled in relation to the magnitude of the difference between the gain K and the threshold T. Thus, a number of different scaled deceleration trajectories can be used depending upon the extent to which the VCM torque constant has been reduced.

Figure 7:
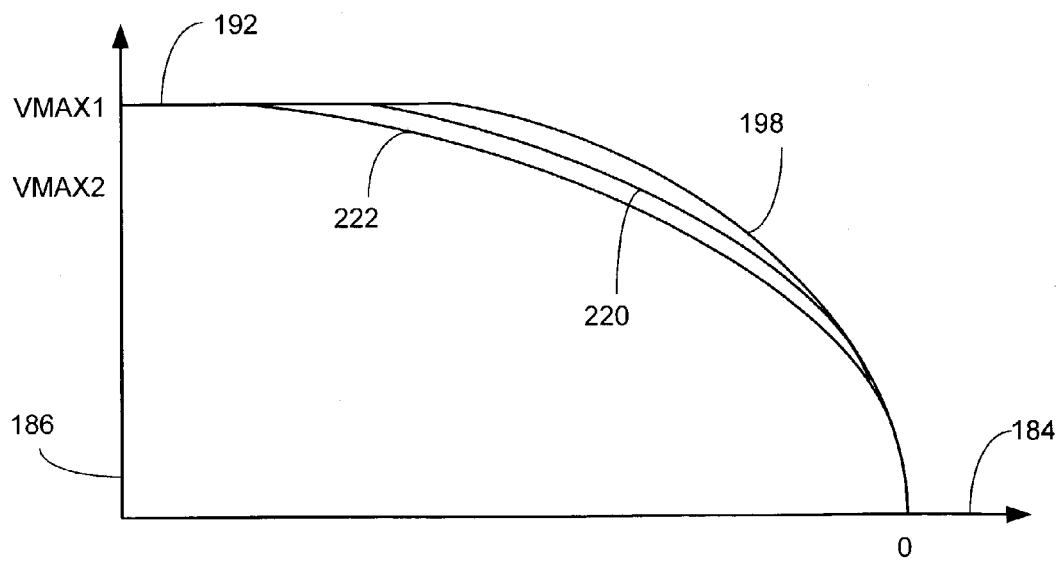
FIG. 7 illustrates a standard deceleration trajectory and a series of scaled deceleration trajectories for the servo control circuit.

As shown by FIG. 7, deceleration trajectory 198 corresponds to that previously shown in FIG. 5 and represents the nominal deceleration trajectory used during normal operation. Deceleration trajectory 220 represents a first scaled deceleration trajectory that decelerates the head 112 at a slightly slower rate as trajectory 198, and trajectory 222 represents a second scaled deceleration trajectory that decelerates the head at a slightly slower rate than trajectory 220.

Seeks that employ the scaled trajectories 220, 222 still accelerate the head 112 to the VMAX value, but begin decelerating the head sooner so that less effective current is required to properly decelerate the head on the destination track. Alternatively, the scaled deceleration trajectories can have the same general slope as the nominal trajectory 198, but employ a reduced maximum velocity during the seek.

Figure 8:
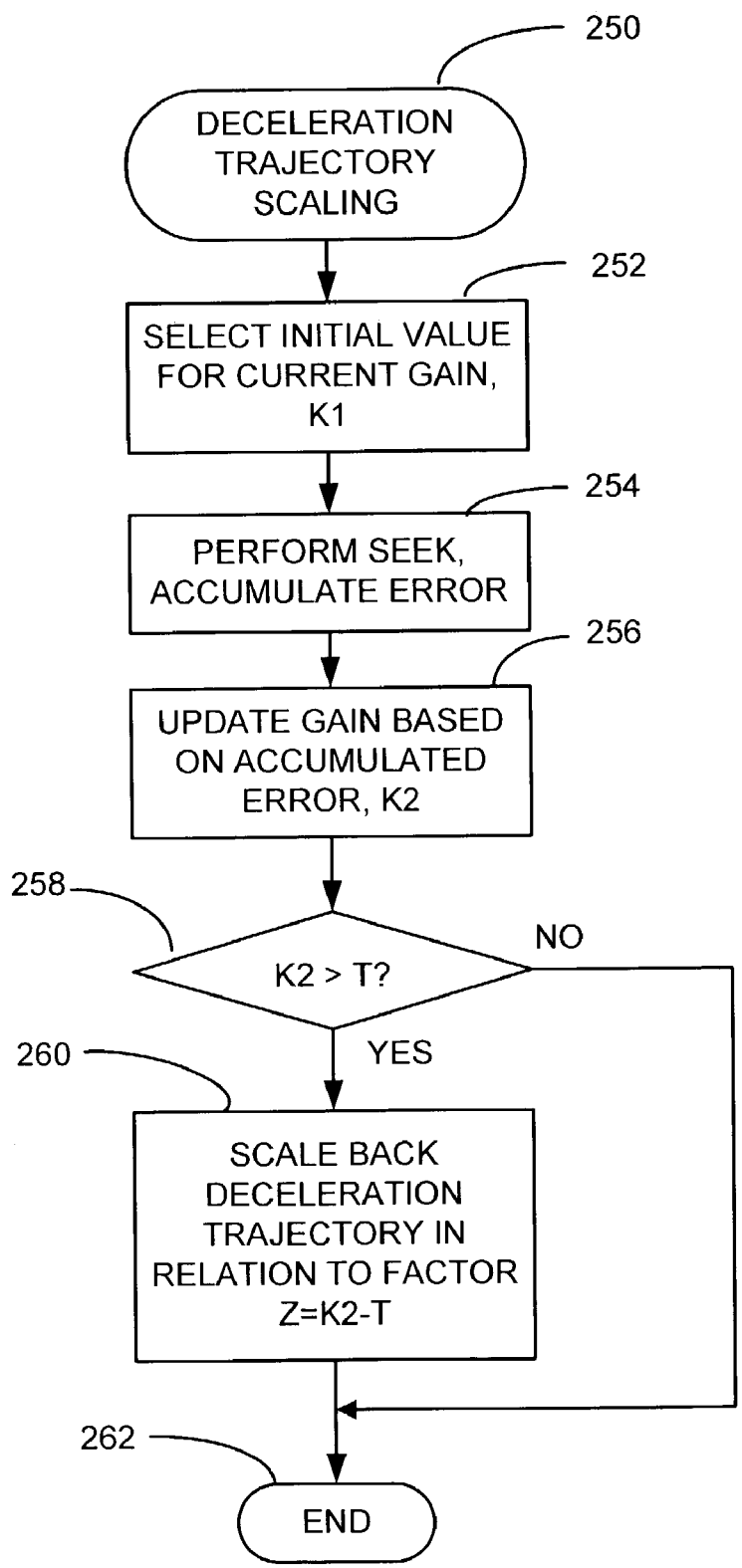
FIG. 8 is a flow chart for a DECELERATION TRAJECTORY SCALING routine generally illustrative of steps carried out by the servo control circuit in accordance with preferred embodiments of the present invention.

FIG. 8 provides a flow chart for a DECELERATION TRAJECTORY SCALING routine 250, generally illustrative of steps carried out by the servo circuit 178 during operation in accordance with preferred embodiments of the present invention to compensate for changes in VCM torque constant.

An initial value K1 is selected and used for the current gain (block 212, FIG. 6), as shown by step 252. This initial value of current gain can be a default value loaded upon disc drive initialization, or can be a value that is adaptively derived during operation.

A seek operation is performed at step 254 using this initial value of current gain. The seek operation is preferably carried out as described in FIG. 5, and the velocity error is accumulated during concluding portions of the seek as described above.

The accumulated error is used to update the current gain to an updated value K2 at step 256. The updated gain value K2 is thereafter used by the servo circuit 178 until the next gain adjustment is made. It will be noted that the current gain adjustment of step 256 can be performed in any number of ways in response to a given parameter, so that the use of the accumulated velocity error at the conclusion of the seek to adjust the gain is merely illustrative and not necessarily limiting to the scope of the claimed invention.

At decision step 258, the updated value of the current gain K2 is next compared to a predetermined threshold T. As discussed above, the threshold T is preferably selected to correspond to a point beyond which saturation of the VCM 116 can occur. When the updated gain K2 exceeds the threshold T, the flow continues to step 260 where the seek deceleration trajectory is scaled, preferably in relation to the difference Z between the updated gain K2 and the threshold T. Thus, a new, derated deceleration trajectory (such as 220 or 222 in FIG. 7) is selected for use during the next seek and the routine ends at step 262.

On the other hand, when the updated current gain K2 does not exceed the predetermined threshold T, the existing deceleration trajectory is deemed adequate and the routine ends at step 262.

The servo circuit 178 is further preferably configured to switch back to the nominal velocity trajectory if the lower than normal torque constant situation is resolved. Such operation can include the use of a second, lower threshold for the gain which is used to detect when a torque constant increase has occurred (such as after an extended idle condition, etc.).

Accordingly, it will now be understood that preferred embodiments of the present invention are generally directed to a method and apparatus for compensating for variation in the torque constant of a motor, such as an actuator motor (such as 116) used by a servo control circuit (such as 178) to position a data transducing head (such as 112) in a data storage device (such as 100)

In accordance with preferred embodiments, an actuator (such as 110). supports the head adjacent a data recording surface (such as 108) on which a plurality of tracks (such as 120) are defined. The actuator motor is coupled to the actuator and configured to move the head across the data recording surface.

A servo circuit (such as 178) outputs current to the actuator motor to carry out a seek to move the head from an initial track to a destination track in accordance with a velocity profile (such as 180) having a nominal deceleration trajectory (such as 198) along which the head is decelerated to reach the destination track.

The servo circuit operates to adjust an initial value of gain to a second value in response to a selected parameter (such as by step 256), and scales the nominal deceleration trajectory to a derated deceleration trajectory (such as 220, 222) in relation to the second value of the gain (such as by step 260).

Preferably, the servo circuit operates to accumulate velocity error during the seek (such as by step 254) and adjusts the initial value of the gain to the second value in relation to the accumulated velocity error. The servo circuit further preferably compares the second value of the gain to a predetermined threshold (such as by step 258) and selects the derated deceleration trajectory in relation to a difference between the second value of the gain and the predetermined threshold.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the appended claims.

What is claimed is:

1. A method comprising steps of determining an accumulated velocity error value for a motor over a plurality of time intervals during which the motor is controlled using a first gain value, adjusting said gain value to a second gain value in relation to said accumulated value, comparing the second gain value to a predetermined threshold, and adjusting a deceleration trajectory used to control the motor by an amount proportional to a difference between the second gain value and the predetermined threshold.

2. The method of claim 1, wherein the accumulated value of the determining step is obtained in relation to a target velocity of the motor and an actual velocity of the motor for each of said plurality of time intervals during a seek operation to move a member affixed to the motor from an initial position to a destination position using the first gain value.

3. The method of claim 2, further comprising a subsequent step of performing a second seek operation while controlling the motor using the second gain value.

4. An apparatus comprising a motor control circuit adapted to control a motor using a first gain value while determining an accumulated velocity error value for the motor by accumulating velocity error over a plurality of time intervals, to adjust said gain value to a second gain value in relation to said accumulated value, to compare the second gain value to a predetermined threshold, and to select a derated deceleration trajectory in relation to a difference between the second gain value and the predetermined threshold.

5. The apparatus of claim 4, wherein the circuit determines the accumulated velocity error value during a deceleration of the motor in relation to a target velocity of the motor and an actual velocity of the motor for each of said plurality of time intervals.

* * * * *